Feb. 22, 1938. R. W. NILSSON 2,109,074
VEHICLE SPRING SUSPENSION
Filed Oct. 12, 1936 2 Sheets-Sheet 1
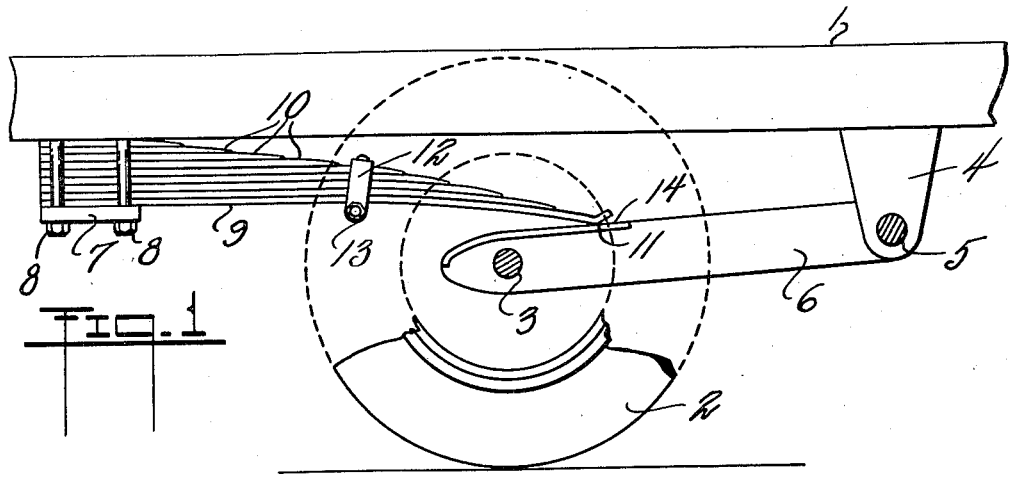
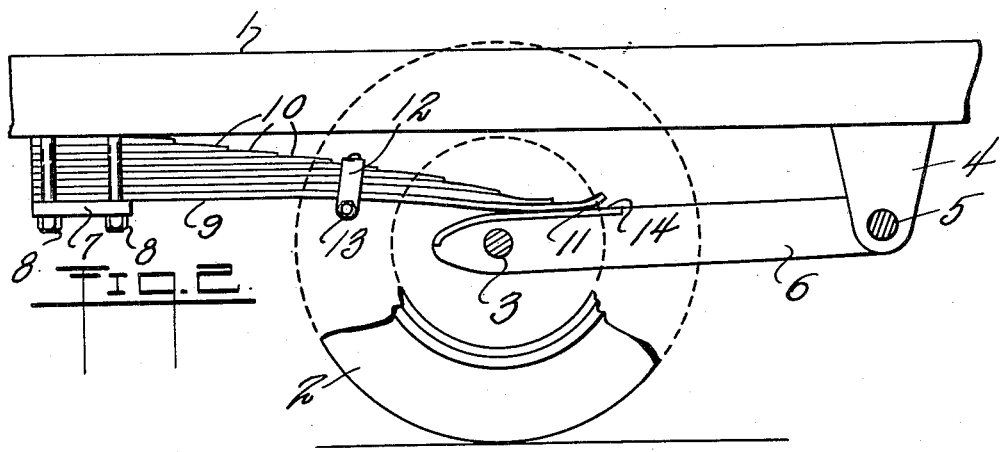
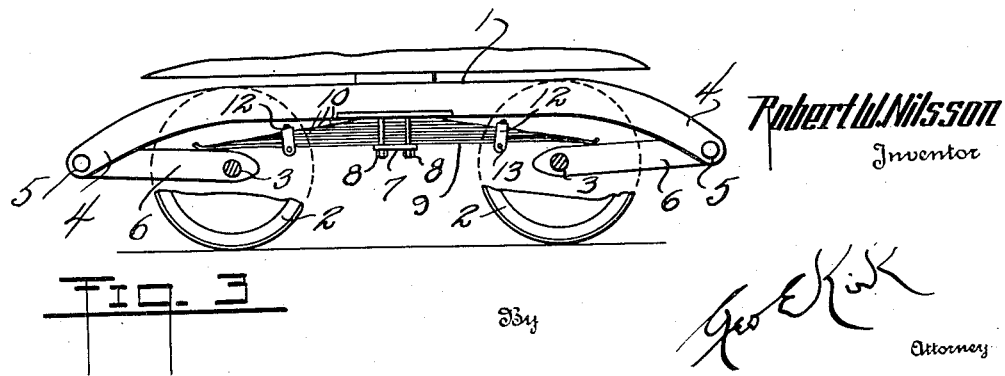
Robert W. Nilsson
Inventor Feb. 22, 1938.   R. W. NILSSON   2,109,074
VEHICLE SPRING SUSPENSION
Filed Oct. 12, 1936   2 Sheets-Sheet 2
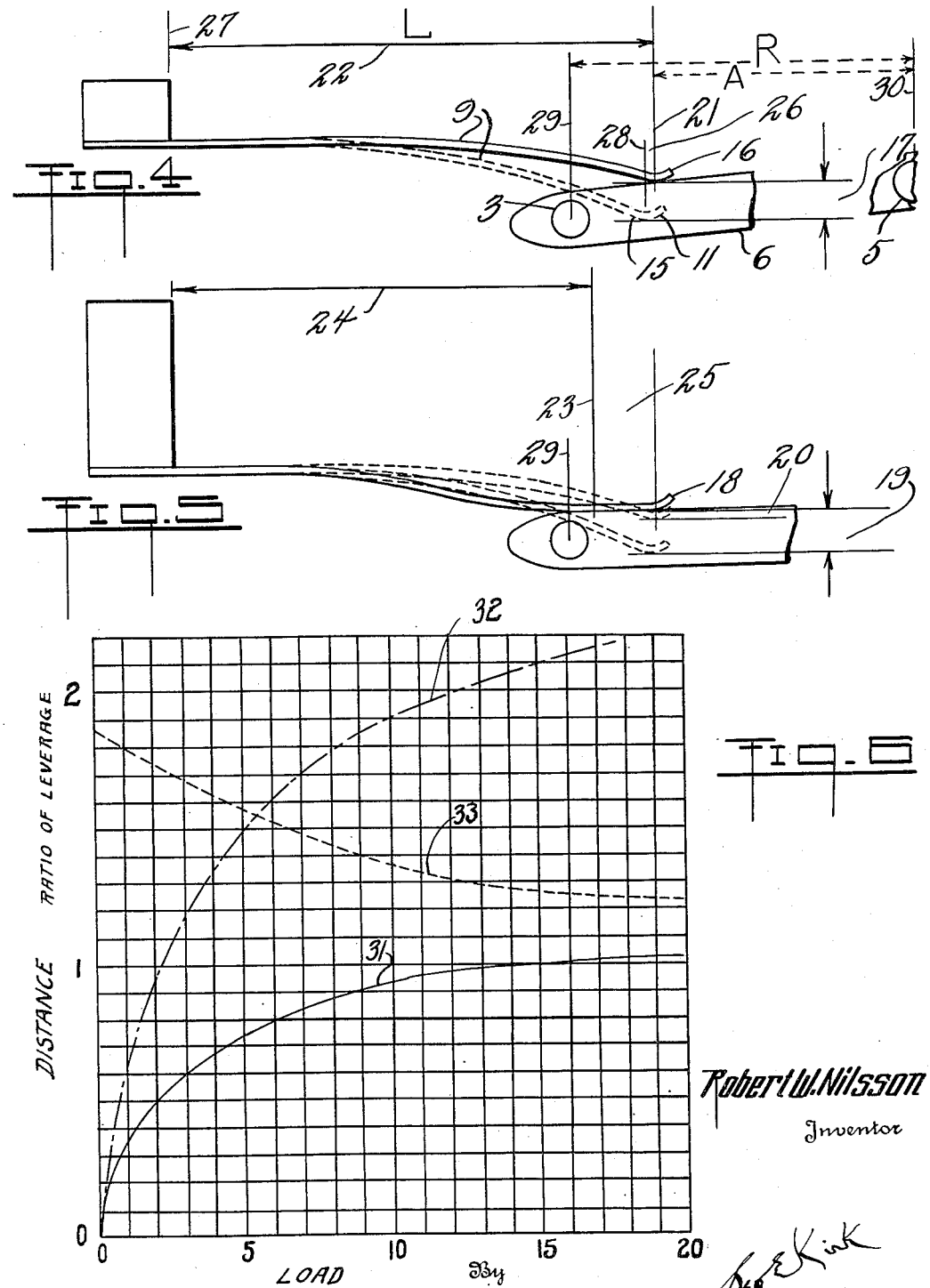

Patented Feb. 22, 1938

2,109,074

UNITED STATES PATENT OFFICE 2,109,074

VEHICLE SPRING SUSPENSION

Robert W. Nilsson, Toledo, Ohio, assignor to The Mather Spring Company, Toledo, Ohio, a corporation of Ohio Application October 12, 1936, Serial No. 105,309

2 Claims. (Cl. 267—19)

This invention relates to yieldable assembly.

This invention has utility when incorporated between a load and support, more especially in transit for effective time factor frequency control under variable conditions that may not be disastrous to suspending loads or to live freight and even to passenger traffic in rolling stock, more especially for motor bus, railway, and similar vehicles.

Referring to the drawings:

Fig. 1 is a fragmentary side elevation of an embodiment of the invention in assembled position at no load;

Fig. 2 is a view similar to Fig. 1 with the structure under normal load, and in which the yieldable member is a quarter elliptical spring;

Fig. 3 is a view of an embodiment of the invention in a truck embodying wheel pairs assembled with this unit hereof, as in railway rolling stock, parts being broken away;

Fig. 4 is a diagrammatic view showing an embodiment of the invention with range of variation from no load to assembly or light load;

Fig. 5 is a view of the device of Fig. 4 at the position of normal load; and

Fig. 6 is a graph of performance as to spring flexure under load variation.

Chassis or body member 1 of a road vehicle is shown sustained by supporting member or wheel 2 as in motor vehicle truck operation or buses. The wheel 2 is provided with axle 3 which may be non-rotary, whereby the wheel may turn thereon. The body 1 is herein shown provided with depending bracket 4 having pivot pin 5, from which extends radius rod or link 6 to the axle 3. There is thus provided a positive spacing or swing for relative movement between the member 2 and the member 1.

Fixed with the body 1 by plate 7 and bolts 8, there is provided a clamp for leaf spring having major leaf 9 and minor leaves 10. The major leaf 9 may have free end remote from the clamp 7, 8, configured to provide bearing surface 11. The spring leaves may be assembled by clip 12 having fastening bolt 13 therefor. This yieldable resistance means fixed with the member 1 has the free or relatively movable end 11 thereof disposed for cooperative relation with bearing face 14 fixed with the radius rod 6 and configured as may be desired for cooperation in the swing of this radius rod as the wheel 2 moves toward and from the body 1.

In this assembly, the spring leaf 9 to its terminus 11 has shift from no load position 15 (Fig. 4) to assembly or light load position 16 involving a deflection 17 therebetween, notwithstanding the assembly load be a considerable minimum from the normal load. Further loading of this spring in its assembly may cause the leaf 9 to effect further deflection to point 18 (Fig. 5) or total deflection 19, which as to the deflection 17, shows an increase 20 in such deflection which is a minor fraction of the deflection 17, notwithstanding the greatly increased load and further notwithstanding the fact that the spring is still effective in flexing for resilient handling of a carried load as in rolling stock operations. Coacting to this end is the material change in the effective length of the resilient means or leaf spring as a beam from light load position 21 for effective beam length 22 to normal load position 23 having effective beam length 24. It is thus to be noted there is a beam length shrinkage 25 in these load operations, while the beam length change distance 26 between no assembly and light load is relatively negligible.

The practical values arising thereunder have to do with the control thus had for reducing the deflection, notwithstanding the great increase of the load in approaching normal or therebeyond relatively to the deflection to assembly. This deflection is of great importance in traffic operations because of the frequency or periodicity which may arise from the spring oscillations at desired carrying loads.

This frequency may be of such a rate that suspended freight is jerked from its hangers, as in fresh meat, to land upon the car floor. With livestock, the vibration rate may be such as to disturb the physical condition of the animal, or of a human being. In this connection, there seems to be among human beings an effective suspension for the internal organs to withstand walking or analogous moving at the rate of as much as three miles per hour, or an estimated frequency of say 100 per minute or less. There is vast importance in keeping from over-reaching such practical limit in the handling of passengers, either on railway or motor bus operations, and there is of course importance in the handling of livestock for trade. A factor in this frequency is the distance of oscillation, and the importance hereunder lies in retaining the cushioning effect of the spring and avoiding the deflection distance which would be a disastrous factor against safe transit of dead or live freight or passengers.

The time formula hereunder adopted is $$T = 2\pi \sqrt{\frac{d}{g}} = .319\sqrt{d}$$

wherein T is the time in seconds of one oscillation or deflection, $d$ is the distance in inches of such deflection, and $g$ is gravity 32.16 ft. per second.

In the disclosure adopted for the light load, it is shown that $d=5\frac{1}{8}''$. Solving this, we find that the time is .72 plus and this fraction of a second taken will establish a frequency as 83 per minute. For the increase of normal load, $d=5\frac{7}{8}''$. Similarly solving, it is shown that the T of this formula amounts to .78 second and that the frequency is 76 per minute.

As pointed out, the configuration of the free end of the leaf spring and the cooperating portion of the radius rod or link may be prescribed to control this effective length as well as the deflection. The deflection is proportional to the cube of the effective length. Accordingly, as this effective length may be decreased, there is a material retarding factor introduced. This resilient member herein may be analyzed as a beam of uniform stress under the formula $$d = \frac{PL^3}{32EI}$$

wherein $d$ is the distance of oscillation or deflection, P is the power or weight of the load, L is the deflective length of the beam, E is the modulus of elasticity for the structure of the beam, and I is the moment of inertia.

The leaf spring as disposed herein for a free end is a progressive cantilever action. The disclosure hereof is one wherein the resilient assembly for cushioning the come-and-go action between the members is of maintained effectiveness over a range for a practical factor of safety and wherein there is avoided harshness normally tending to affect a light load when there is response for cushioning of a heavy load. This is brought about as set forth herein, due to the interaction between the variation in the effective length of the resilient means as a beam and the retention of a deflection for the shift or oscillation. It is thus seen that the lever action of the beam for its effective length is decreased as the load increases, and that the deflection for oscillation, while retained, is decreased in its extent of response.

It is to be noted the deflection range of resilience as decreasing in the disclosure herein, notwithstanding the great increase in weight or load, is not only of maintained resilience but has such range or deflection so reduced that there may be preservation of the range for resilience independently of hammering the wheels by the car body or in motor vehicle work of having the pockets or wells rubbed by the wheels or tires. Furthermore, especially where there is desired a range for clearance as in vehicles as to curb or loading docks and especially for step heights in motor vehicles, this radius deflection may still be convenient for practical stepping, notwithstanding there is the retained property for yielding under the road or load conditions with which confronted.

In further elaboration of the operations hereunder, there may be taken into account the effective length of the deflectable beam or leaf spring from fixed line 27 as the anchorage for the leaf spring with a member as the chassis to line 28 of coaction of the spring at no-load, 21 at light load, or 23 at a normal load. Line 29 of opposing load action through the axle 3 introduces the factor of length for the lever from this line 29 to line 30 through the pivot pin 5 for the radius rod or link 6. Considering this link or radius rod 6 as a lever it has a variable arm length, noted herein by the shifting of the lines 28, 21, 23. There is thus a variable A for this action length of arm of the lever as to the length R, the perpendicular distance between the pivot pin 5 and the axle 3. The variable for the beam length from the line 27 to the effective line for coaction may be taken as L. When only a small load is imposed on the member combination or suspension, there is benefit not only of the leverage which magnifies this load to an amount for which designed, but also an unusual length of spring in this deflectable beam which, if maintained throughout the full range of deflection or travel, might in practice be prohibitively flexible. Hereunder a small load may become responsive as though it were a heavy load and it is made to act on the relatively flexible beam or leaf spring herein with the resulting movement proportionally large to the leverage assembly. This adopted range for the vertical movement of the axle toward and from the vehicle body with the resultant variation in greater shortening of the effective length of the spring during the corresponding increase in the effective length of the radius rod or lever arm, is a movement which preferably occurs with the spring deflections and radius rod swingings toward substantially parallel relation throughout the normal vehicle operation.

Upon increase of the load, the axle travel or shifting of the member 3 relatively to the opposing member may be hereunder designed to respond continuously within the practical range but in a less range of deflection. This is brought about due to the lever coacting with the spring or beam in a less mechanical advantage, for it approaches the line 29 of action for the axle 3. In fact, in design this may be even lengthened to be at the mechanical disadvantage to be longer or farther away from the line 30 than the line 29 for the deflectable beam or spring length.

As hereunder shown, this is a progressive reduction. This progress may be in practice toward a normal load condition with even a factor thereover to direct action at the line 29, if not therebeyond to the mechanical disadvantage. It is thus seen that there is retained a deflection range against non-resilient abutting in the operation hereunder.

The set-up of this cooperation for effective inter-relation is shown by the curve 31 for the distance of deflection of the spring at the point of contact of the spring with the radius rod 6 under different load reactions between the axle 3 and the load member opposed thereto, and having relatively fixed pivot pin 5 and holding line 27 for the deflectable beam. Under this system of loading, the shifting of the axle 3 as to its distance or deflection is shown by the curve 32. The ratio of the effective length for the radius rod, that is, from the line through the pivot pin 5 to be a perpendicular distance line through the axle 3 as the numerator and the distance A along such lever from the pivot pin 5 to the line of action through the contact of the free end of the beam with the arm as the denominator, shows the curve 33. This may be interpreted as the other curves, that the deflection is greater with the mechanical disadvantage and that as such mechanical disadvantage decreases, the shifting is less extensive and there is a smoothing out but still a retained deflection range.

What is claimed and it is desired to secure by Letters Patent is:

1. Vehicle stabilizing means of controlled frequency resistance embodying a body member, a wheel supporting member shiftable relatively to the body member, a radius rod pivotally connected as a link between the members, and a leaf spring having a free end and a bearing seat therealong, said rod having an opposing continuous seat, said rod and said spring being substantially parallel throughout their normal operation and said seats being so constructed that the vertical shifting between the members causes a greater extent of shifting of the contact point between said seats, thereby changing the effective spring length.

2. Vehicle stabilizing means of controlled frequency resistance embodying a body member, a wheel supporting member shiftable relatively to the body member, a radius rod pivotally connected as a link between the members, and a leaf spring having a free end and a bearing seat therealong, said rod having an opposing continuous seat, said rod and said spring being substantially parallel throughout their normal operation and said bearing seats being so constructed that shifting of the contact point between the seats during the vertical change of distance between the members causes the spring deflection to increase the effective length of the arm more than such change in the distance between the members with complemental reduction in the effective length of the spring.

ROBERT W. NILSSON.